United States Patent
Corvaglia et al.

(10) Patent No.: US 11,845,203 B2
(45) Date of Patent: Dec. 19, 2023

(54) COMPRESSION MOLDING DEVICE OF PARTS IN COMPOSITE MATERIAL STARTING FROM PLATES IN COMPOSITE WITH A THERMOPLASTIC MATRIX

(71) Applicant: LEONARDO S.p.A., Rome (IT)

(72) Inventors: Stefano Giuseppe Corvaglia, Grottaglie (IT); Nicola Gallo, Grottaglie (IT); Silvio Pappadà, Grottaglie (IT); Giuseppe Buccoliero, Grottaglie (IT); Nicola Miani, Grottaglie (IT)

(73) Assignee: LEONARDO S.P.A.

( * ) Notice: Subject to any disclaimer, the term of this patent is extended or adjusted under 35 U.S.C. 154(b) by 119 days.

(21) Appl. No.: 17/010,024

(22) Filed: Sep. 2, 2020

(65) Prior Publication Data
US 2021/0060831 A1 Mar. 4, 2021

(30) Foreign Application Priority Data
Sep. 3, 2019 (IT) .................. 102019000015509

(51) Int. Cl.
  *B29C 43/36* (2006.01)
  *B29C 43/02* (2006.01)
  *B29C 70/46* (2006.01)

(52) U.S. Cl.
  CPC ............ *B29C 43/36* (2013.01); *B29C 43/021* (2013.01); *B29C 70/46* (2013.01); *B29C 2043/3602* (2013.01)

(58) Field of Classification Search
  None
  See application file for complete search history.

(56) References Cited

U.S. PATENT DOCUMENTS

| 2007/0035064 A1* | 2/2007 | Coffield ................. A47C 7/282 |
| | | 425/397 |
| 2013/0101694 A1* | 4/2013 | Theinert ................. B29B 11/16 |
| | | 425/383 |

(Continued)

FOREIGN PATENT DOCUMENTS

| EP | 2875931 A1 | 5/2015 |
| EP | 3 473 397 A1 * | 4/2019 |

(Continued)

OTHER PUBLICATIONS

Italian Search Report and Written Opinion issued by Ministero dello Sviluppo Economico for Italian Application No. IT201900015509, dated Apr. 14, 2020, pp. 1-9.

*Primary Examiner* — Mohammad M Ameen
(74) *Attorney, Agent, or Firm* — The Belles Group, P.C.

(57) ABSTRACT

A compression molding device configured for the production of a part in composite material starting from a plate in composite with a thermoplastic matrix is described. The device comprises: a fixed support structure; an upper half-die provided with a first contoured surface corresponding to the profile of an upper surface of the part to be made; a lower half-die provided with a second contoured surface corresponding to the profile of a lower surface of the part to be made; holding means carried by the support structure and configured to hold the plate in a position interposed between the half-dies; and moving means for moving at least one of the half-dies from and towards the plate. The holding means comprise two or more releasable grippers gripping by friction distinct portions of the peripheral edge of the plate and configured to completely release or allow the complete release of the plate.

10 Claims, 7 Drawing Sheets

(56) References Cited

U.S. PATENT DOCUMENTS

2014/0166417 A1 6/2014 De Taeye et al.
2015/0258743 A1 9/2015 Lanard et al.

FOREIGN PATENT DOCUMENTS

EP    3473397 A1   4/2019
JP    2016043507 A 4/2016

* cited by examiner

COMPRESSION MOLDING DEVICE OF PARTS IN COMPOSITE MATERIAL STARTING FROM PLATES IN COMPOSITE WITH A THERMOPLASTIC MATRIX

CROSS-REFERENCE TO RELATED PATENT APPLICATIONS

The present application claims priority to Italian Patent Application No. 102019000015509, filed Sep. 3, 2019. The disclosure of the aforementioned priority application is incorporated herein by reference in its entirety.

SECTOR OF THE ART

The present invention relates to a compression molding device for the production of parts in composite material, in particular for aeronautical applications, starting from plates in composite with a thermoplastic matrix.

PRIOR ART

As is known, composite materials are used in various industrial sectors, including the aeronautical industry. In particular, fibre-reinforced composite materials, commonly referred to as "prepregs", which generally consist of a semi-finished product comprising a matrix of resin and reinforcing fibres immersed in the matrix are known. The fibres can be arranged according to different configurations, for example in a single direction, in two or more directions having different orientations from each other, or they can be arranged so as to form a fabric. The matrix is used to fix the fibres together and possibly to other components during production.

The prepregs are generally prepared in the form of strips and wound into rolls; in order to achieve the desired mechanical properties, the prepregs must undergo a process of consolidation by heat and often also under pressure.

The use of prepregs having a matrix of thermoplastic material in the aeronautical industry is known.

In this type of prepregs, the resin of the matrix has a high molecular weight and, therefore, on the one hand it does not need to be subjected to a polymerization cycle and on the other hand it does not have tackiness characteristics.

A prepreg with a thermoplastic matrix can be considered as a first approximation as a manufactured article in final conditions formed by a single sheet or plate. Therefore, in order to form a laminate, it must be heated so as to melt at least the surfaces in contact with the layers of thermoplastic prepreg that compose it, compact it under pressure, and then let it cool. The temperature to be reached for melting is the glass transition temperature $T_g$ for amorphous thermoplastics, and the melting temperature $T_f$ for semi-crystalline thermoplastics.

In these cases, the apparatus for producing a laminate based on thermoplastic prepregs should also supply the heat to reach a temperature (which depending on the materials can be excessively high) such as to melt the resin and thus obtain an adhesion between the different layers that will make up the laminate; moreover, for semi-crystalline thermoplastics, a too rapid cooling could cause the amorphization of the part, with a consequent loss of performance characteristics.

Composite materials with a thermoplastic matrix have numerous advantages, like for example as follows:
they are stable at room temperature;
they have a high resilience;
they allow quick processing;
they do not require autoclave operations; and
they are recyclable.

In order to realise the desired configurations of the parts or of the components in composite material with a matrix in thermoplastic resin, the use of compression molding devices is known, especially in the aeronautical sector.

In particular, such molding devices generally comprise a preheating station, in which a pre-consolidated plane plate in composite material with a matrix in thermoplastic resin is subjected to a heating operation so as to obtain the softening thereof, and a molding station, in which the plate that has been pre-consolidated and subsequently heated in the preheating station is subjected to a compression molding operation so as to obtain the desired part or component.

The molding station essentially comprises:
a fixed support structure;
an upper half-die provided with a lower contoured surface corresponding to the profile of an upper surface of the part in composite material to be made by molding;
a lower half-die provided with an upper contoured surface corresponding to the profile of a lower surface of the part in composite material to be made by molding;
holding elements carried by the support structure in a fixed position and configured to hold the plate in a position interposed between the upper half-die and the lower half-die during the whole molding operation; and
a mover for moving at least one of the upper half-die and lower half-die from and towards the plate in a direction transverse to the plate itself.

The holding elements usually comprise fixed arms or springs carried by the support structure and engaging in use respective through holes obtained on the lateral ears of the plate to be subjected to molding. In particular, the plates to be molded are cut out from sheets of pre-consolidated composite material so as to feature the desired number of lateral ears which subsequently must be fixed on the arms or on the holding springs of the support structure of the molding device. Said lateral ears are perforated to allow the insertion of the arms or of the holding springs.

Following the molding operation, the ears are then removed to obtain the desired final shape.

It is clear that the use of molding devices of this type results in the formation of a relatively high quantity of scraps which is badly compatible with the generally rather high cost of composite materials.

Since the starting plates are cut out from a larger sheet of composite material, in order to reduce the scraps as much as possible, it is necessary to ensure that the cut-out shapes interpenetrate each other (the "protuberances" of a shape to be cut out must "engage" the "cavities" of the adjacent shapes). However, this is not always possible and, even when it is possible, the ears to be made on each plate constitute an additional complication to take into account when trying to reduce waste.

The removal of the ears from the molded parts or components, in addition to causing further scraps, constitutes an additional operation to be carried out in the process for forming the finished parts or components.

DESCRIPTION OF THE INVENTION

An object of the present invention is therefore to provide a compression molding device for the production of parts in composite material starting from plates in composite with a thermoplastic matrix, which allows to obviate in a simple and economic way the drawbacks connected with molding devices of a known type and specified above.

According to the present invention, a compression molding device for the production of parts in composite thermoplastic material, as claimed in claim 1 and in the claims dependent on it, is provided.

BRIEF DESCRIPTION OF THE DRAWINGS

The present invention will now be described with reference to the accompanying drawings, which illustrate an example of non-limiting embodiment, where.

PREFERRED EMBODIMENT OF THE INVENTION

Figure 1:
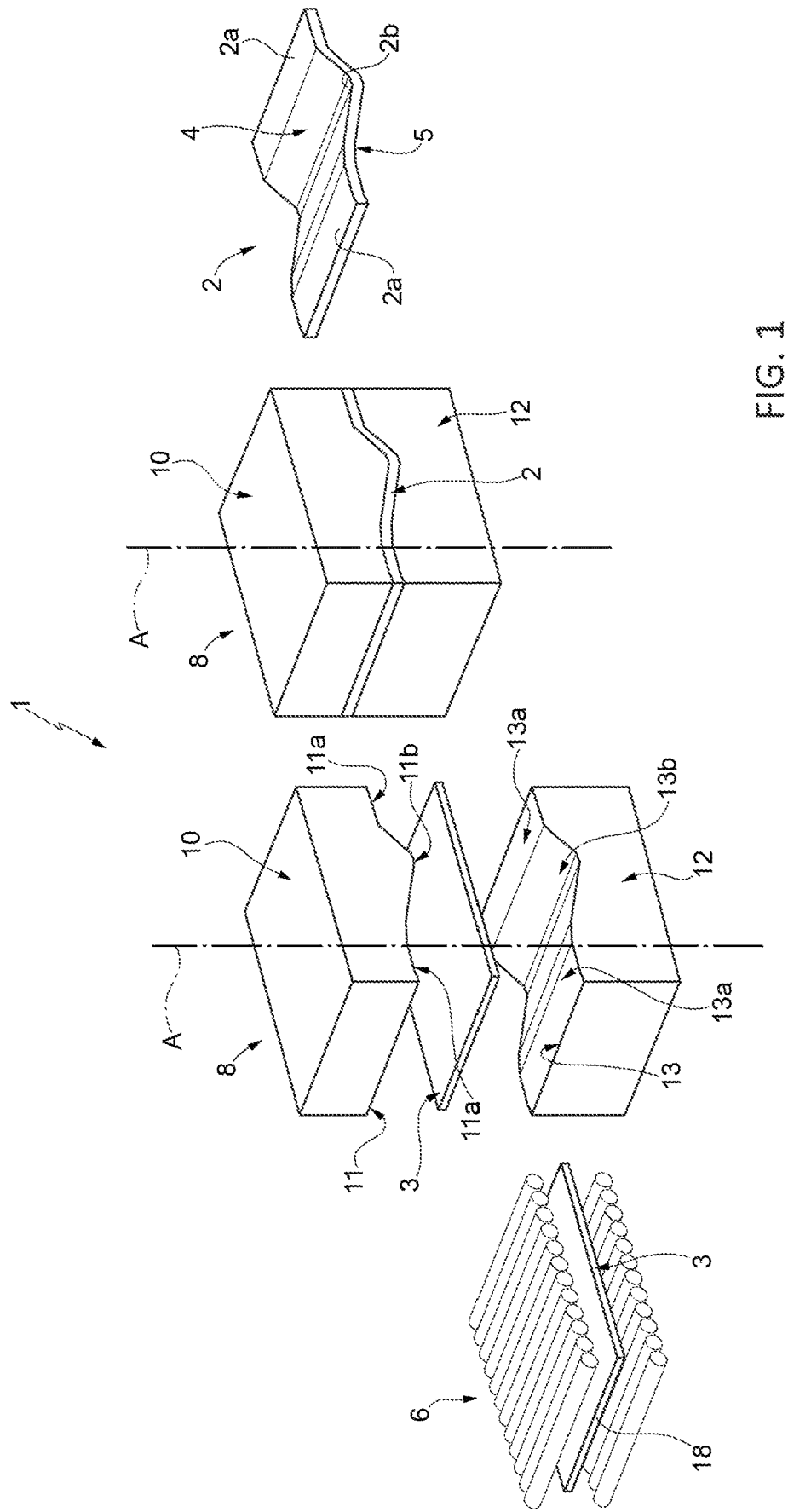
FIG. 1 is a schematic perspective view, with parts removed for clarity's sake, of a compression molding device according to the present invention during the production of a first example of a part in composite material starting from a plate in composite with a thermoplastic matrix.
Figure 2:
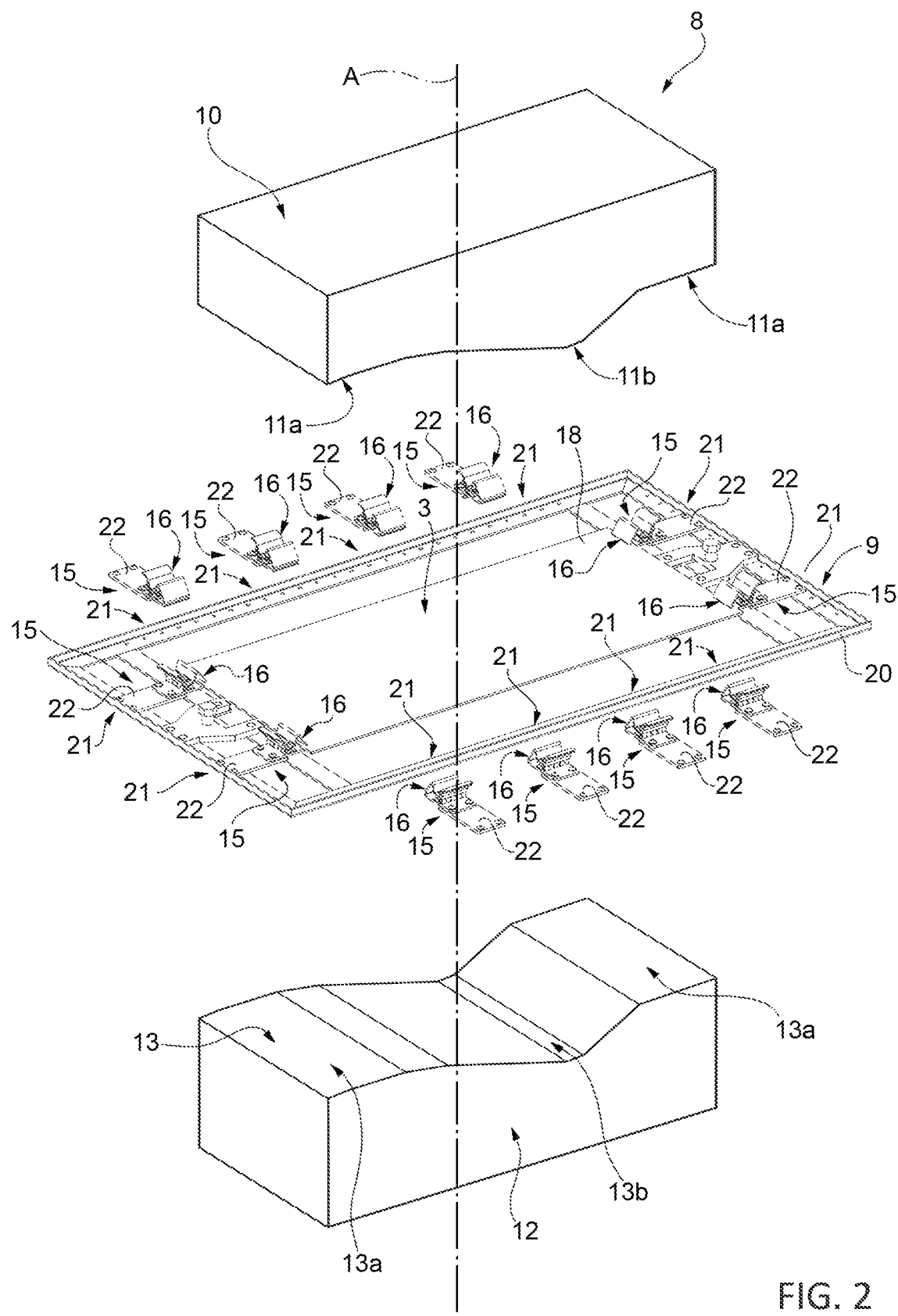
FIG. 2 is a schematic perspective view on an enlarged scale, with parts removed for clarity's sake, of a part of the molding device of FIG. 1.

In FIGS. 1 and 2, 1 indicates as a whole an example of a compression molding device according to the present invention configured to produce a first example of a part or component 2 in composite material, preferably for use in the aeronautical sector, starting from a plane plate 3 in composite material with a thermoplastic matrix, in particular having a matrix based on thermoplastic, semi-crystalline or amorphous resin.

In the first case, the semi-crystalline thermoplastic resin can be for example polyether-ether-ketone, or PEEK. Alternatively, said semi-crystalline thermoplastic resin can be for example polyether-ketone-ketone, or PEKK. An example of an amorphous thermoplastic resin is represented by polyetherimide, or PEI.

The reinforcing fibres can be arranged in one or more unidirectional layers, in several layers having different orientations from each other or as a fabric.

The reinforcing fibres are preferably made of carbon; alternatively, other types of reinforcing fibres known in the aeronautical sector can be used, such as for example glass fibres or a combination of glass and carbon fibres.

It should be noted that the starting plate 3 for carrying out the molding operation is a pre-consolidated plate, i.e. subjected in a known manner to a preliminary consolidation operation in a high-temperature press.

In the case illustrated, the starting plate 3 for the production of the part 2 in composite material has a plane rectangular conformation.

The part 2 in composite material to be produced by molding starting from the plate 3 has (FIG. 1) two lateral opposite, plane, horizontal portions 2a and arranged on the same lying plane, and a central portion 2b having a substantially V-shaped profile, that is formed by two oblique sections converging towards each other into a common edge (i.e. the vertex of the V), preferably shaped like a plane horizontal strip, starting from the lateral opposite portions 2a.

In practice, the part 2 has an upper surface 4, concave at the central portion 2b, and a lower surface 5, opposite the upper surface 4 and convex at the central portion 2b itself.

The molding device 1 comprises a preheating station 6, for example an infrared ray oven, in which the pre-consolidated plate 3 is subjected to a heating operation so as to obtain the softening thereof, and a molding station 8, in which the plate 3 that is pre-consolidated and subsequently heated in the preheating station 6 is subjected to a compression molding operation so as to obtain the part 2.

The molding station 8 essentially comprises:
- a fixed support structure 9 (visible only partially in FIGS. 2, 3, 5, 6 and 7 limitedly to the innovative part with respect to the known art);
- an upper half-die 10 provided with a lower contoured surface 11 corresponding to the profile of the upper surface 4 of the part 2 in composite material to be made by molding;
- a lower half-die 12 provided with an upper contoured surface 13 corresponding to the profile of the lower surface 5 of the part 2 in composite material to be made by molding;
- holding elements 15 carried by the support structure 9 in a fixed position and configured to hold the plate 3 in a position interposed between the upper half-die 10 and the lower half-die 12; and
- a mover, known per se and not illustrated, for moving one or both of the upper half-die 10 and lower half-die 12 from and towards the plate 3 in a direction A transverse to the plate 3 itself.

In the case illustrated, the contoured surface 11 of the upper half-die 10 has two lateral opposite, plane, horizontal sections 11a arranged on the same lying plane, and a central section 11b defining a protuberance substantially having a V-shaped profile, i.e. formed by two oblique sections converging towards each other into a common edge (the vertex of the V), preferably shaped like a plane horizontal strip, starting from the opposite lateral sections 11a.

The contoured surface 13 of the lower half-die 12 has a conformation complementary to that of the contoured surface 11 of the upper half-die 10 and comprises two lateral opposite, plane, horizontal sections 13a arranged on the same lying plane, and a central section 13b defining a cavity with substantially a V-shaped profile, i.e. formed by two oblique sections converging towards each other into a common edge (the vertex of the V), preferably shaped like a flat horizontal strip, starting from the lateral opposite sections 13a.

The laterals sections 11a, 13a are intended to form the lateral portions 2a of the part 2, while the central sections 11b, 13b are intended to form the central portion 2b of the part 2 to be made by molding.

It is evident that the part 2 illustrated herein is only an example of the possible parts or components in composite material that can be produced by means of the molding device according to the dictates of the present invention; as will be illustrated hereinafter, by simply varying the conformation of the contoured surfaces 11, 13 of the upper half-die 10 and lower half-die 12, it is possible to produce various shapes of parts in composite material.

Advantageously, the holding elements 15 comprise respective releasable grippers 16 configured to grip by friction distinct portions of a peripheral edge 18 of the plate 3 and to completely release or allow the complete release of the plate 3 itself when the latter is compressed between the upper half-die 10 and the lower half-die 12 during the molding operation.

In practice, the grippers 16 are configured to exert a retention force on the plate 3 less than the thrust received by the plate 3 itself in the direction of extraction from the grippers 16 during compression between the upper half-die 10 and the lower half-die 12.

In this way, the grippers 16 are configured to release the plate 3 and completely release the plate 3 in use, more precisely the peripheral edge 18 of the plate 3 itself, when the latter is compressed between the upper half-die 10 and the lower half-die 12 during the molding operation.

Figure 3:
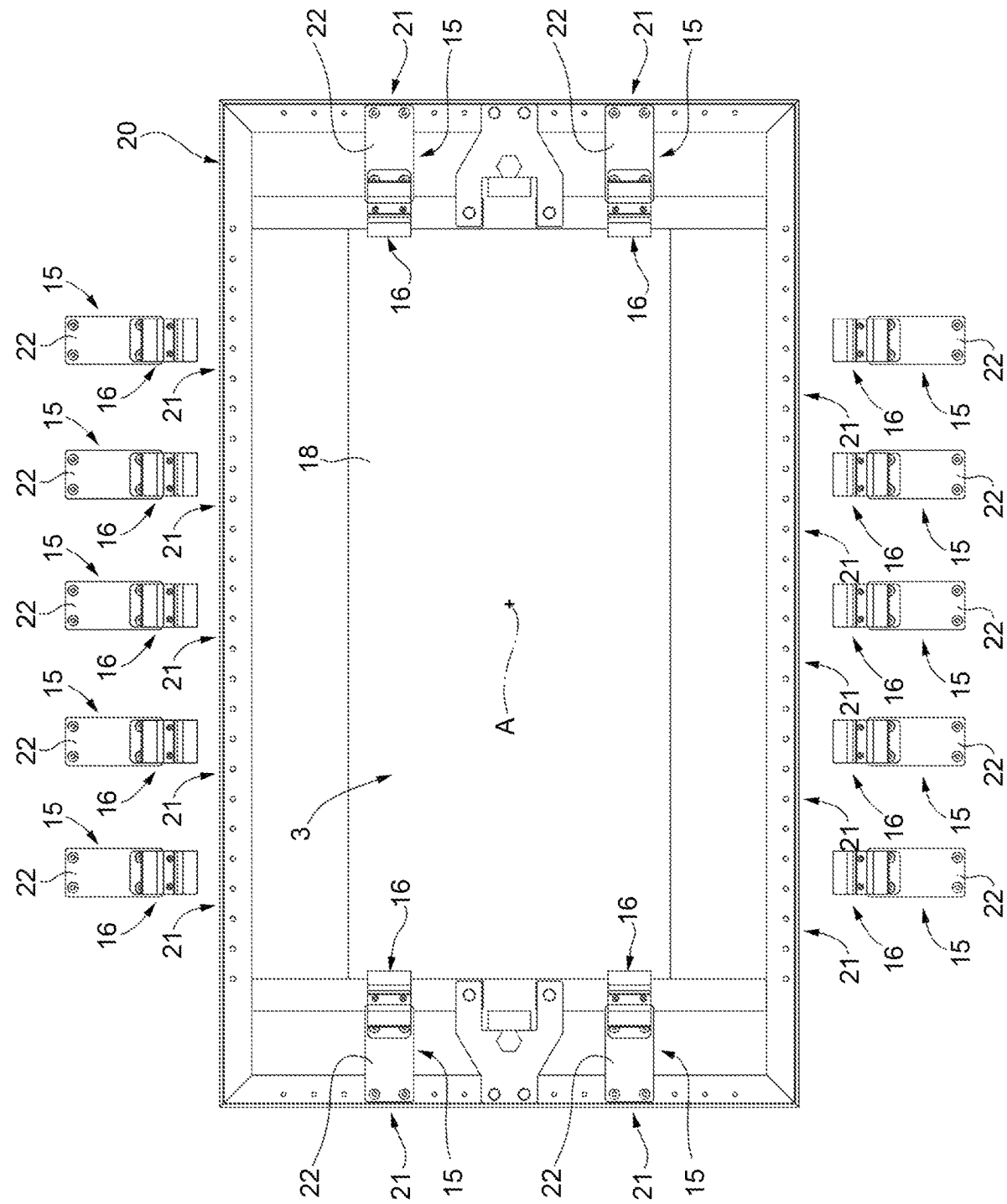
FIG. 3 is a plan view on an enlarged scale of a part of a support structure of the plate to be molded forming part of the molding device of FIG. 2.
Figure 5:
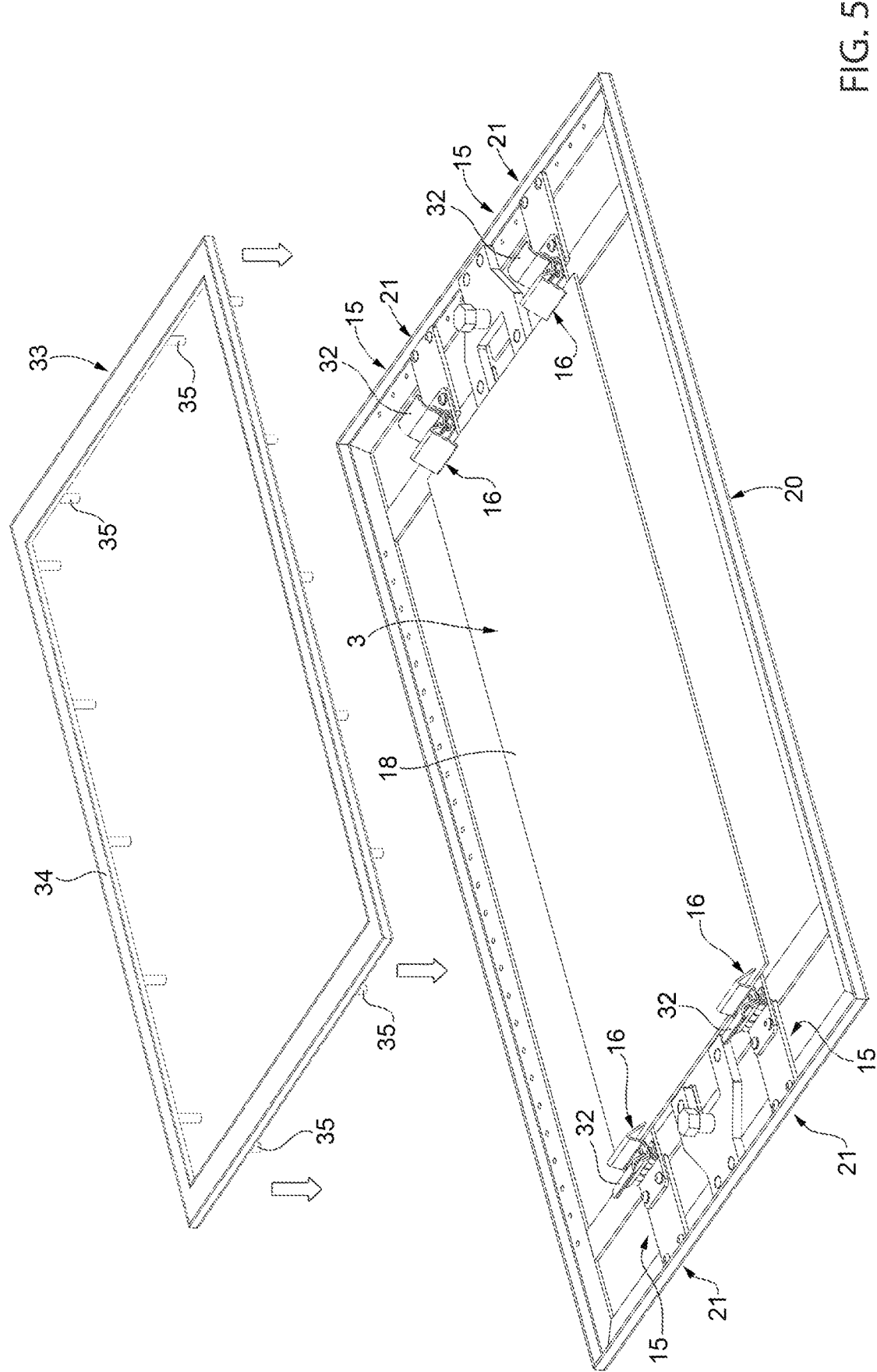
FIG. 5 is a perspective view on a reduced scale of the support structure of FIG. 3 and of an actuator member of the molding device according to the present invention configured to interact with the support structure itself.

As illustrated in FIGS. 2, 3 and 5, the support structure 9 comprises a frame element 20, in this case with a rectangular profile, having a plurality of attachment areas 21 for the selective fixing of a desired number of grippers 16 correlated to the configuration of the plate 3 to be molded and to the retention force on the plate 3 itself which is desired to be obtained.

In the case illustrated, two grippers 16 are used, fixed on each of the two shorter sides of the frame element 20 and cooperating with lateral opposite portions of the peripheral edge 18 of the plate 3.

As is visible in FIGS. 2, 3, 5, 6 and 7, the grippers 16 are fixed internally to the frame element 20 through support arms 22 of variable or extensible length so as to be able to adapt to different profiles of the plate to be subjected to molding.

Figure 6:
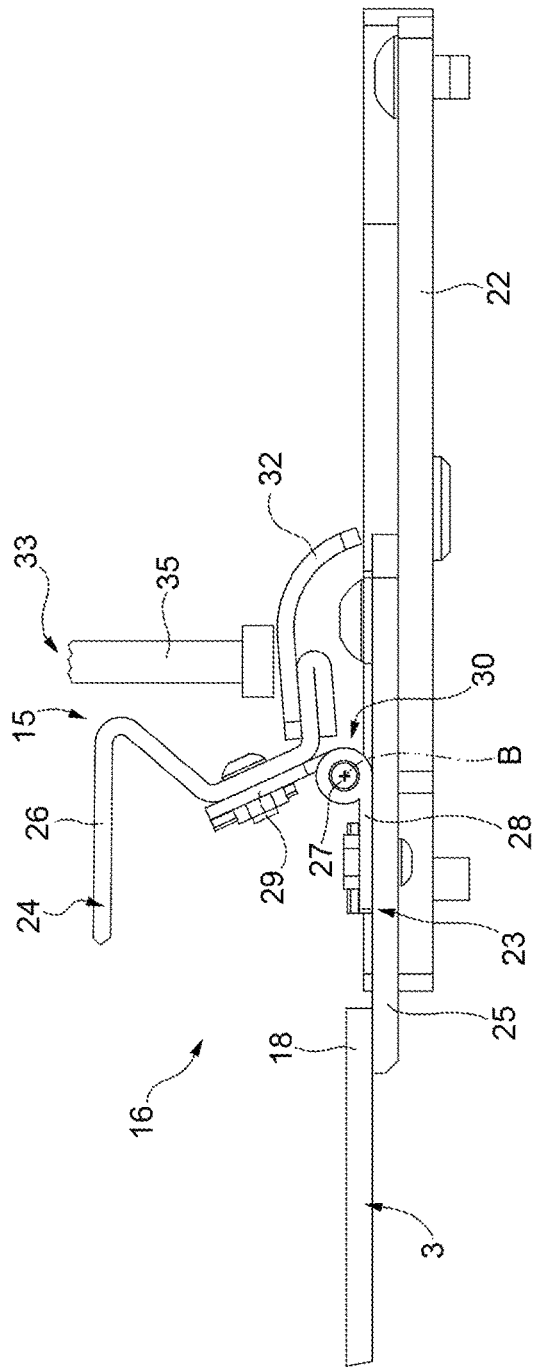
FIGS. 6 and 7 are side views on a reduced scale of the detail of FIG. 4 in different operating phases during the interaction with the actuator member of FIG. 5.

With reference to FIGS. 2 to 7, each gripper 16 comprises two jaws 23, 24, hinged together around a common axis B that is parallel to the relative side of the frame element 20 to which the gripper 16 itself is fixed, and which are movable between a closing configuration (FIGS. 4 and 7) and an opening configuration (FIG. 6).

In particular, in the opening configuration, the jaws 23, 24 of each gripper 16 hold by friction the relative portion of the peripheral edge 18 of the plate 3; otherwise, in the opening configuration, the jaws 23 and 24 of each gripper 16 are moved away from one another with respect to the closing configuration to allow the insertion or removal of the plate 3.

The hinging axes B of the jaws 23, 24 of each gripper 16 are orthogonal to the direction A and parallel to the relative side of the peripheral edge 18 of the plate 3 on which they act.

Figure 4:
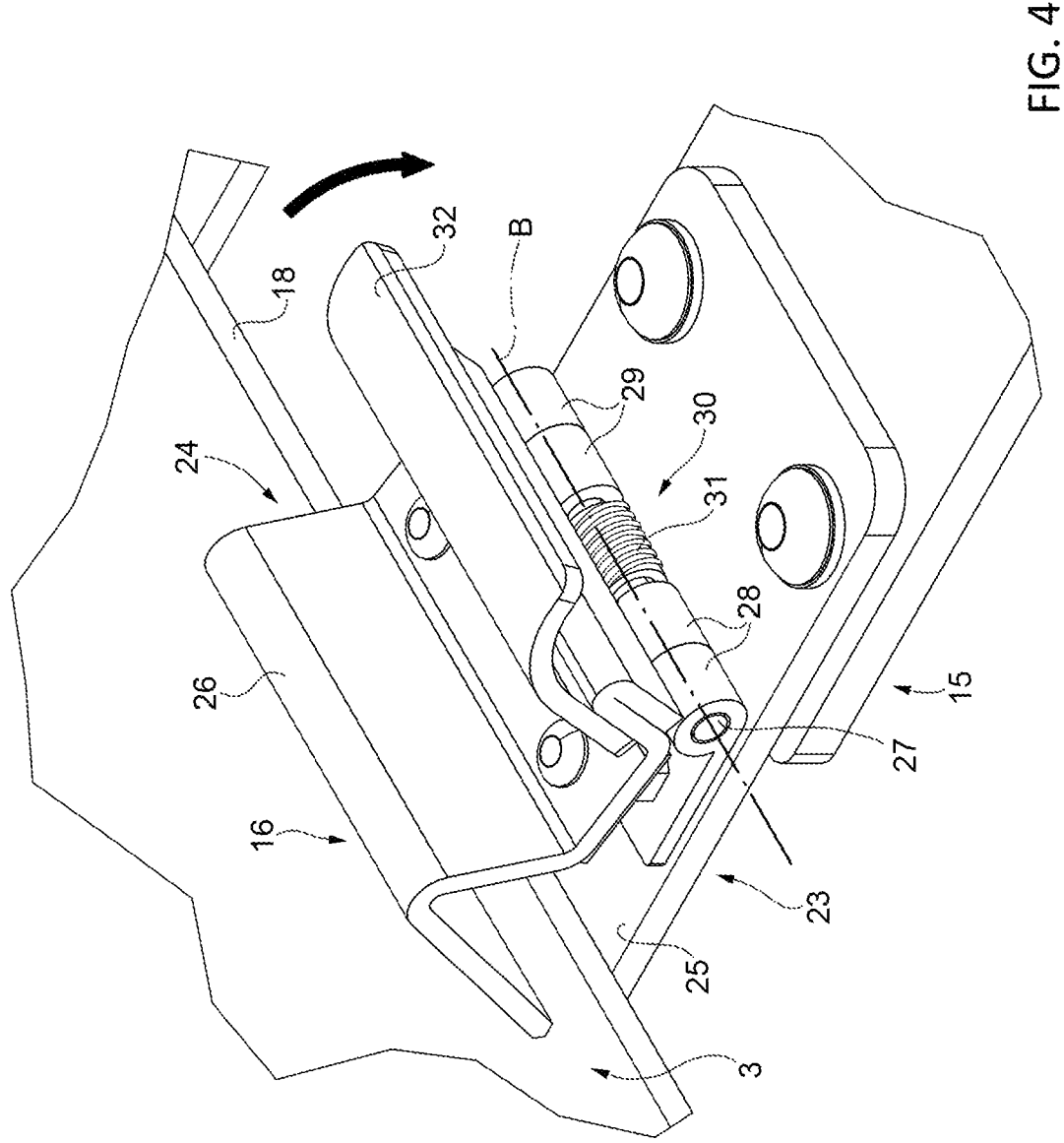
FIG. 4 is a perspective view on an enlarged scale of a detail of FIG. 3.

With particular reference to the solution illustrated in FIGS. 4, 6 and 7, the jaw 23 of each gripper 16 is arranged below the jaw 24 and is fixed to the relative support arm 22 so as to project from the latter in the same direction of extension towards the inside of the frame element 20; the jaw 23 has a substantially flat front operative portion 25 extending from the hinging area with the relative jaw 24 and defining a support for the relative portion of the peripheral edge 18 of the plate 3.

The jaw 24 of each gripper 16 has a front operative portion 26, also extending from the hinging area with the relative jaw 23 and substantially V-shaped with concavity facing towards the jaw 23 itself so as to cooperate with the relative plate 3 along a line or strip of the latter.

The hinging area between the jaws 23 and 24 of each gripper 16 comprises a pin 27 of axis B, one or more arms 28 wound around the pin 27 and fixed to the jaw 23 and one or more arms 29 also wound around the pin 27 and fixed to jaw 24.

Each gripper 16 also comprises actuator means 30 configured to load one or both of the relative jaws 23, 24 towards the closing configuration and defining the retention force on the relative plate 3.

In the case illustrated, the actuator means 30 of each gripper 16 comprise a spring 31, in particular with a cylindrical helix, wound around the relative pin 27 and acting on the jaws 23, 24 through the respective arms 28, 29 so as to push the same jaws 23, 24 towards the closing configuration.

According to a possible alternative, not illustrated, the actuator means 30 could comprise a hydraulic or electric actuator with automatic adjustment of the closing force acting on the jaws 23, 24 of each gripper 16.

Each gripper 16 also comprises an actuating portion 32 carried by one of the jaws 23, 24, extending rearwardly from the hinging zone B with respect to the relative operating portion 25, 26 and actuatable from the outside to bring the gripper itself into the opening configuration.

In the case illustrated, the actuating portion 32 is constituted by a plate fixed, at its own end portion 32a, to the jaw 24 in proximity to the hinging area and protruding rearwardly in a cantilever manner from the jaw 24 itself. In greater detail, the actuating portion 32 of each gripper 16 extends posteriorly to the jaw 23 so as to spread apart therefrom starting from the hinging area and has a free end portion 32b, opposite the end portion 32a and slightly bent towards the jaw 23 itself.

Figure 7:
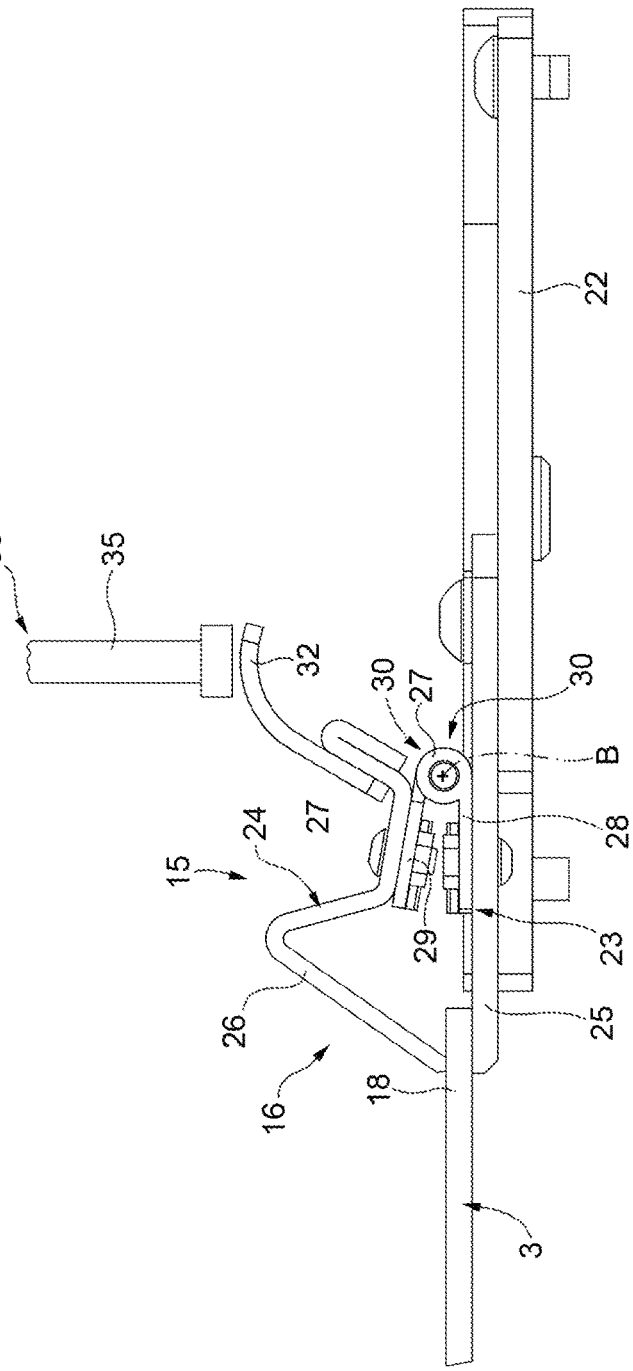

With particular reference to FIGS. 5, 6 and 7, the molding device 1 also comprises further actuator means 33 acting on the actuating portions 32 of the gripper 16 to move the grippers 16 themselves into the opening configurations.

In the case illustrated, the actuator means 33 comprise a further frame element 34, preferably with a rectangular profile, displaceable from and towards the frame element 20 carrying the grippers 16 and provided with pushers 35 to act simultaneously on the actuating portions 32 of the grippers 16 themselves.

In particular, the pushers 35 consist of preferably cylindrical elements protruding orthogonally in a cantilever manner from the frame element 34 parallel to the direction A, positioned at the actuating portions 32 of the grippers 16 and adapted to act simultaneously on all the actuating portions 32 against the action of the respective springs 31 during the movement of the frame element 34 towards the frame element 20 in order to move the jaws 24 away from the respective jaws 23 and arrange the grippers 16 into the opening configuration.

According to a possible alternative, not illustrated, the actuator means 33 could also comprise a plurality of actuator members, for example of the fluidic type, acting individually on the actuating portions 32 of the respective grippers 16.

Figure 8A:
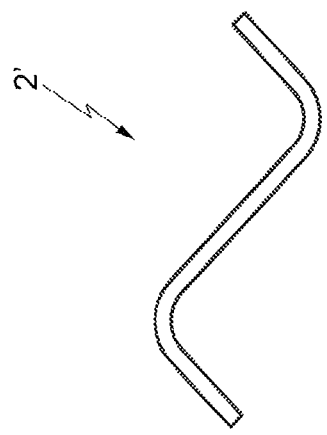
FIGS. 8A, 8B and 8C are side views of further examples of parts in composite material with a thermoplastic matrix which can be produced by means of the molding device according to the dictates of the present invention.
Figure 8B:
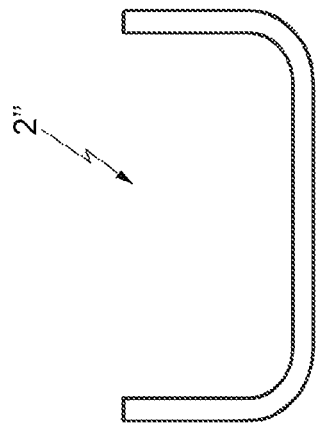
Figure 8C:
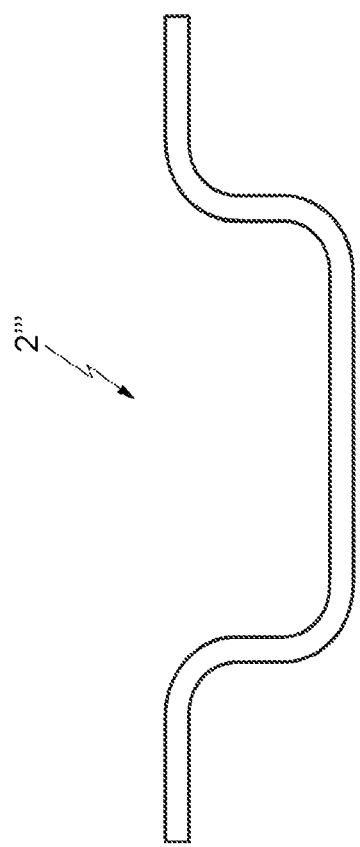

FIGS. 8A, 8B and 8C illustrate other possible examples of parts or components in composite material, indicated respectively with the references 2', 2", 2'", which can be produced by means of the molding device according to the present invention starting from plates in composite with a thermoplastic matrix. It is clear that in order to obtain the parts 2', 2", 2'" it is necessary to modify the conformation of the contoured surfaces 11, 13 of the half-dies 10, 12 and it could be required to start from plates with profiles and proportions other than those of the plate 3.

The part 2' of FIG. 8A has a substantially S-contoured profile; the part 2" of FIG. 8B instead has a substantially U-contoured profile; finally, the part 2''' of FIG. 8C has a substantially U-contoured profile with opposite flat lateral protrusions extending from the free ends of the U in directions that are opposite one another.

The operation of the molding device 1 is described below with reference to the production of a single part 2 starting from a respective pre-consolidated plate 3 having a flat rectangular conformation.

In particular, the plate 3 is first of all subjected to a preliminary heating operation in the preheating station 6 in order to soften the material which constitutes it.

Subsequently, the preheated plate 3 is brought into the molding station 8 and secured to the grippers 16 in the desired position between the upper half-die 10 and lower half-die 12. More precisely, by lowering the frame element 34 along the direction A towards the frame element 20, the pushers 35 cooperate, by pushing, with the actuating portions 32 of the grippers 16 fixed to the frame element 20 itself (FIG. 6). The actuating portions 32 of the jaws 24 are simultaneously lowered towards the respective jaws 23 thus causing the jaws 24 to rotate around the pins 27 with respect to the relative jaws 23 until reaching the opening configuration.

In this condition, the plate 3 is inserted with its peripheral edge 18 resting on the front portions 25 of the jaws 23; subsequently, by moving the frame element 34 upwards again, the actuating portions 32 of the jaws 24 are left free, thus allowing the jaws 24 to rotate around the pins 27 until reaching the closing configuration (FIGS. 2, 3, 4, 5, 7).

Once the positioning of the plate 3 on the support structure 9 in a position interposed between the upper half-die 10 and the lower half-die 12 is ended, it is possible to proceed with the actual molding operation by moving only one of the half-dies 10, 12 themselves or both of them towards the plate 3.

As soon as the plate 3 is compressed between the contoured surfaces 11, 13 of the half-dies 10, 12, the force imparted by the latter on the plate 3 causes the complete release of the plate 3 itself from the grippers 16.

After the opening of the half-dies 10, 12 it is possible to remove the finished part 2.

From an examination of the characteristics of the molding device 1 made according to the dictates of the present invention, the advantages it allows to obtain are evident.

In particular, thanks to the fact that the starting plate 3 is clamped between the grippers 16 directly on its peripheral edge and is subsequently released by the grippers 16 themselves when it is compressed between the two half-dies 10, 12, the finished part 2 no longer has fixing ears to be provided for initially and to be removed after the molding operation. This allows a drastic reduction of scraps both when the starting plate is cut out from the sheet of pre-consolidated composite material as it is not necessary to cut out the fixing ears and after molding as it is not necessary to remove material from the molded part.

Finally, it is clear that modifications and variations can be made to the molding device 1 described and illustrated herein without thereby departing from the scope of protection defined by the claims.

The invention claimed is:

1. A compression molding device configured for the production of a part (2, 2', 2", 2''') in composite material starting from a plate, the plate being a plane plate, in composite with a thermoplastic matrix, said device comprising:
    a fixed support structure;
    an upper half-die provided with a first contoured surface corresponding to the profile of an upper surface of said part (2, 2', 2", 2''') in composite material to be made by molding;
    a lower half-die provided with a second contoured surface corresponding to the profile of a lower surface of said part (2, 2', 2", 2''') in composite material to be made by molding;
    holding elements carried by said support structure in a fixed position and configured to hold said plate in a position interposed between said upper half-die and said lower half-die; and
    a mover for moving at least one of said upper half-die and lower half-die from and towards said plate in a direction (A) transverse to the plate itself;
    wherein said holding elements comprise two or more releasable grippers gripping by friction distinct portions of a peripheral edge of said plate and configured to completely release or allow the complete release of the plate itself as soon as the latter is compressed between the upper half-die and the lower half-die during molding.

2. The device according to claim 1, wherein said grippers are configured to exert a retention force on said plate less than the thrust received by the plate itself in the direction of extraction from said grippers during compression between the upper half-die and the lower half-die.

3. The device according to claim 1, wherein said support structure comprises a frame element having a plurality of attachment areas for the selective fixing of a desired number of grippers correlated to the configuration of the plate to be molded and to the retention force on the plate itself which is desired to be obtained.

4. The device according to claim 3, wherein said grippers are fixed internally to said frame element through support arms of variable or extensible length.

5. The device according to claim 2, wherein each gripper comprises two jaws hinged together and movable between a closing configuration, in which they hold by friction the relative portion of the peripheral edge of said plate, and an opening configuration, in which they are moved away to allow the insertion or removal of said plate; each gripper also comprising a first actuator, in particular an elastic element, configured to load one or both of said jaws towards said closing configuration and defining said retention force on said plate.

6. The device according to claim 5, wherein one of said jaws of each said gripper has a substantially flat front operative portion defining a support for the relative portion of the peripheral edge of said plate, and the other jaw of said jaws of said gripper has a substantially V-shaped front operating portion with concavity facing towards said one of said jaws so as to cooperate with the relative plate along a line or strip thereof.

7. The device according to claim 6, wherein said operative portions of said jaws of each said gripper extend from a common hinging area (B) of the jaws themselves.

8. The device according to claim 7, wherein each said gripper comprises an actuating portion carried by one of said jaws and extending rearwardly from said hinging zone (B) with respect to the relative said operating portion; said device further comprising a second actuator acting on the actuating portions of said grippers to move the grippers themselves into said opening configurations.

9. The device according to claim 8, wherein said second actuator comprises a second frame element displaceable from and towards the frame element carrying the grippers and provided with pushers to act simultaneously on said actuating portions of the grippers themselves.

10. The device according to claim 1, further comprising a heater for softening said plate before subjecting it to the compression action between said upper half-die and said lower half-die.

\* \* \* \* \*